United States Patent [19]
West

[11] Patent Number: 4,773,226
[45] Date of Patent: Sep. 27, 1988

[54] POWER PRODUCTION SYSTEM

[75] Inventor: William S. West, San Clemente, Calif.

[73] Assignee: World Power Systems Inc., Bloomfield, Iowa

[21] Appl. No.: 70,693

[22] Filed: Jul. 7, 1987

[51] Int. Cl.[4] ........................... F23B 5/02; F23J 11/00
[52] U.S. Cl. ...................................... 60/670; 110/204; 110/345
[58] Field of Search .................. 110/345, 204; 60/670, 60/671, 651

[56] References Cited

U.S. PATENT DOCUMENTS

| | | |
|---|---|---|
| 226,570 | 4/1880 | Thuemmler . |
| 1,717,923 | 6/1929 | Greene . |
| 2,415,618 | 2/1947 | West . |
| 3,055,170 | 9/1962 | Westcott, Jr. . |
| 3,608,311 | 9/1970 | Roesel, Jr. . |
| 3,726,239 | 4/1973 | Burbach ............................... 110/345 |
| 3,949,684 | 4/1976 | Copeland ............................ 110/345 |
| 3,961,480 | 6/1976 | West . |
| 3,983,704 | 10/1976 | McFarland . |
| 4,074,526 | 2/1978 | West . |
| 4,209,982 | 7/1980 | Pitts . |
| 4,218,192 | 8/1980 | West . |
| 4,246,756 | 1/1981 | West . |
| 4,283,915 | 8/1981 | McConnell et al. . |
| 4,357,800 | 11/1982 | Hecker . |
| 4,416,117 | 11/1983 | Nyberg . |
| 4,637,211 | 1/1987 | White et al. . |
| 4,656,972 | 4/1987 | Shimoda ............................. 110/204 |
| 4,699,071 | 10/1987 | Vier et al. ........................... 110/345 |

OTHER PUBLICATIONS

Pages 148 & 149 from L. Pauling, *College Chemistry*, (Freeman and Co., 1964).

*Primary Examiner*—Allen M. Ostrager
*Attorney, Agent, or Firm*—Jenner & Block

[57] ABSTRACT

A power production system is disclosed. The system includes a firebox, and fluid-containing heat transfer coils at the firebox sides. The heated fluid is conducted to a transducer for converting that heat into mechanical work. In the illustrated embodiment, the transducer includes a piston and cylinder arrangement. A converter is disposed adjacent the firebox to receive heat and the gaseous products of combustion from the firebox. The converter chemically converts the gaseous products of combustion into less objectionable materials.

14 Claims, 3 Drawing Sheets

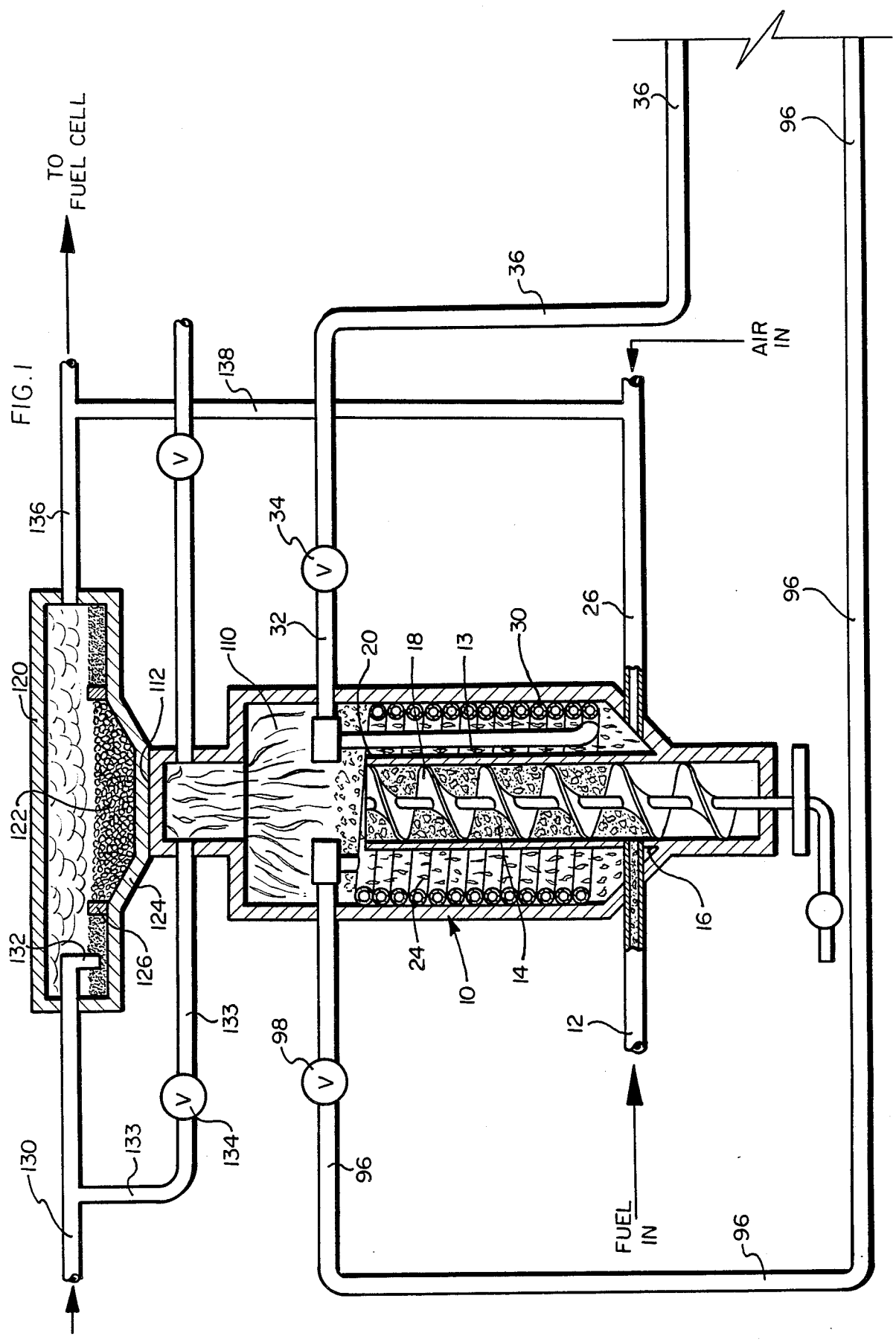

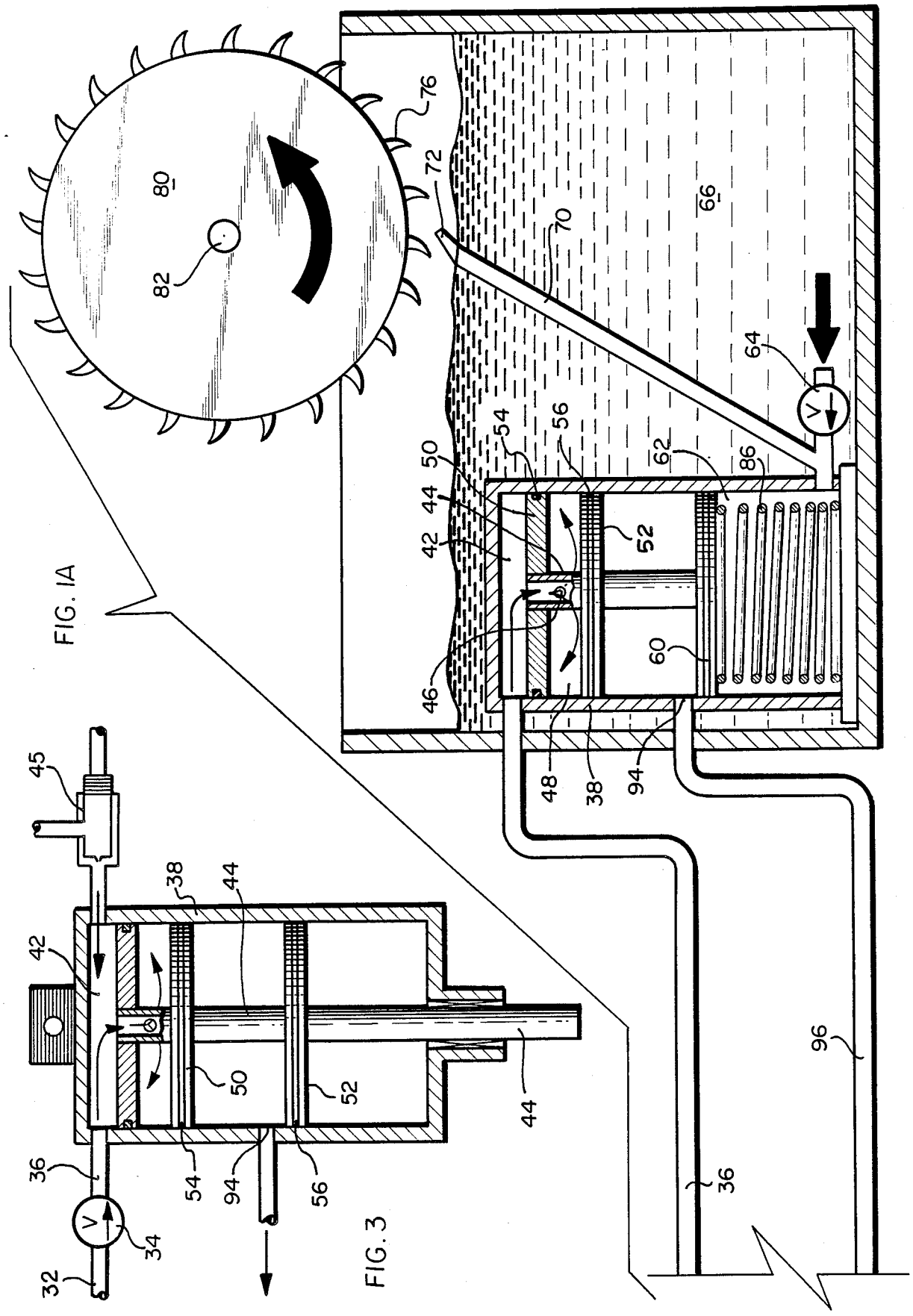

POWER PRODUCTION SYSTEM

BACKGROUND OF THE INVENTION

This invention relates generally to engines or systems for converting the energy found in fuels such as coal to mechanical energy or work. More particularly, the invention concerns a power production system which is energy efficient, yet which produces little if any pollutants.

Power production systems have been essential to the advancement of industrialization. Recently, growing concerns have been expressed about the cost and availability of fuels, and about the pollutants emitted by power systems or engines. Virtually every modern power production system engineering effort must include a consideration of these two factors.

It is the general object of the present invention to provide a power production system which will make efficient use of a wide range of low-cost fuels. It is a related object to provide such a power production system which will produce relatively great amounts of power from these fuels, and yet which will produce little if any pollutants from the consumption of these fuels.

Other objects and advantages of the invention will become apparent upon reading the following detailed description and upon reference to the drawings. Throughout the drawings, like reference numerals referred to like parts.

BRIEF DESCRIPTION OF THE DRAWINGS

FIG. 1 is a schematic view of the invention showing, in partial sectional form, a combustion and heat exchange chamber and associated piping;

FIG. 1A is a schematic view of a power transducer or force modification device connected to the piping of FIG. 1;

FIG. 3 is a schematic view showing, in section, an alternate power transducer or modification device.

DETAILED DESCRIPTION

Figure 2:
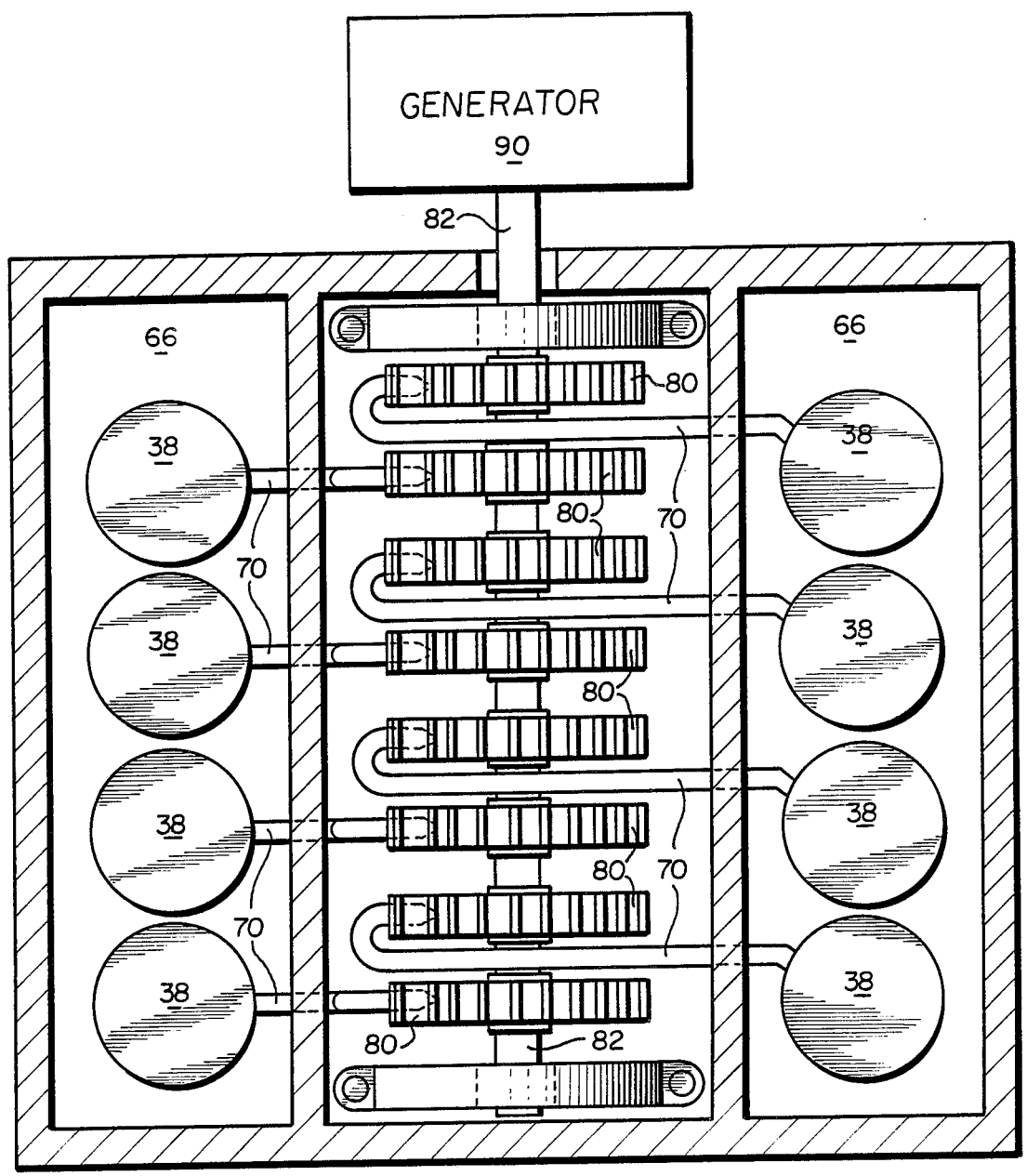
FIG. 2 is a schematic view of the invention showing a number of the drive devices of FIG. 1 arranged to operate a common power or drive train.

Turning more specifically to FIGS. 1 and 1A, there is shown a combustion and heat-exchange chamber 10. Fuel is introduced into this chamber 10 through any suitable means, here illustrated as a pipe 12.

The fuel used in this system can be of any suitable type, and a wide variety of types are available. For example, fuel can take the form of a paste made from coal, ground corncobs, and a fluid such as water. Alternatively, peat fuel, or oil fuel, or other fuels can be used.

In the illustrated device, the fuel 14 is introduced adjacent the lower end 16 of the chamber, and is forced generally upwardly through a coking cylinder 13 by a suitable drive device, such as an auger 18. As the fuel works its way upwardly through the cylinder 13, a coking process occurs because insufficient oxygen is present within the cylinder 13 to permit full fuel combustion and heat generation.

As the fuel reaches the top 20 of the coking cylinders, the coked, hot fuel spills over the top 20 of the cylinder 13, and falls downwardly through a main or outer combustion chamber 24. Air is introduced into this outer combustion chamber 24 by any suitable means, such as an air inlet pipe 26. The upwardly flowing air surrounds the downwardly moving heated and coked fuel particles 24, and combustion occurs. Spent fuel particles 24 can be removed from a bottom 16 of the combustion chamber 24 through any suitable access door or other device (not shown).

Combustion occurring in the combustion chamber 24 serves to heat fluid contained in piping coils 30.

This fluid can be water, or a suitable freon-like fluid, or helium, or ammonia, or other fluid of suitable form. The hot fluid leaves the heater coils 30 via an exit pipe 32, and flows through a shut-off valve 34 which operates in an intermittent mode, as described in further detail below. Fluid passing this valve 34 is then routed along extension piping 36 to an operating cylinder 38 shown in FIG. 1A.

The heatable fluid is admitted into a top chamber 42 formed within the cylinder 38. Fluid within the chamber 42 flows down a hollow piston rod 44 and out one or more bleed holes 46 into an annular chamber 48 formed between an upper piston 50 and a lower piston 52. Appropriate seals 54 and 56 provide pressure-tight barriers between the pistons 50, 52 and the inner wall surfaces of the cylinder 38.

As pressure builds upon the pistons 50 and 52, the pistons 50, 52 and rod 44 are forced downwardly. This downward motion forces downwardly an operating piston 60, thereby tending to reduce the volume of a lower chamber 62. Downward motion of the pistons 50 and 56 will drive piston 56 past an exhaust port 94. Under these circumstances, heatable fluid will travel out the opened port 94, along an exhaust line 96, through a check valve 98, and back into the heating chamber coils 30, as suggested in FIG. 1. Thus, none of the heatable fluid within the coils 30, the piping 36, the cylinder 38, or the piping 96 is lost or expended.

Fluid, such as relatively cool water, has been previously admitted into the chamber 62 below the piston 60 through a one-way check valve 64 from a surrounding vessel 66. As the piston 60 moves downwardly, pressurized fluid is expelled and is routed along a pipe 70 to a nozzle 72 arranged to cause pressurized fluid impact against turbine blades 76 mounted upon a turbine wheel 80. This turbine wheel 80 can be arranged to turn a drive shaft 82 in known manner. Spent fluid emitted from the nozzle 72 and the blades 76 falls back into the collecting chamber 66.

When the piston 60 reaches the downward end of its stroke, the valve 34 (FIG. 1) is closed, and no more pressurized fluid is admitted into the cylinder 38 through the pipe 36. Because the cylinder 38 is surrounded by a relatively cool fluid found in the vessel 66, the heatable fluid in the chamber 42 begins to cool, and pressure begins to drop within the chamber 42 and then within the chamber 48. This drop in pressure permits the pistons 50, 52 and 60 to rise within the cylinder 38. If desired, this rising or re-setting action can be assisted by a spring 86 or other suitable biasing device located within the chamber 62. As the piston 60 rises, the one-way check valve 64 automatically opens to admit cool fluid from the vessel 66 into the chamber 62. When the pistons 50, 56 and 60 have fully risen, the operating cycle is repeated.

It will be understood that an intermittent driving action is thus imparted to the turbine wheel 80 and the drive shaft 82. If desired, continuous power can be imparted to the drive shaft 82. To accomplish this in accordance with one aspect of the invention, a series of cylinders 38, nozzle pipes 70 and nozzles 72 can be arranged together so as to drive a common drive shaft 82 as suggested in FIG. 2. The shaft 82 can be connected to an electric generator 90 or other suitable power transducer of known type.

It will be understood that mechanical force can be provided from the mechanism found in cylinder 38 in forms other than hydraulic. As suggested in FIG. 3, a simple reciprocal driving force or motion can be provided by an extended piston rod 44.

If desired, a fuel injector 45 can be provided to inject a fuel such as diesel oil, gasoline, fuel oil, natural gas, ammonium nitrate etc. to provide combustion and power in the chamber 42 and communicating spaces. If an injector 45 is provided, suitable exhaust system elements are connected to the exhaust part 94 and pipe 96 to draw away and process the products of combustion.

Undesirable emissions are controlled and additional power can be extracted from the combustion occurring within the chamber 24, in accordance with an important object of the invention. As shown in FIG. 1, the hot gaseous products of combustion 110 reach a heat transfer area 112 atop the chamber 10. In a chamber 120 mounted atop the heat transfer area 112, iron filings or particles are provided in a dish-shaped area formed by a bowl recess 124 and short baffles 126. A mixture of air and heated water or steam is introduced into the chamber 120 via suitable piping 130 and an inlet nozzle 132. In addition, the products of combustion 110 are drawn from area 112 by suitable piping 133 and a control valve 134, and are routed to the chamber 120 by the piping 130. A reaction occurs between the iron filings, the steam, the products of combustion and the air to produce a gaseous mixture consisting of about 60 percent hydrogen ($H_2$), 30 percent methane ($CH_4$) and 10 percent sulfer dioxide ($SO_2$) and carbon monoxide ($CO$). This gaseous mixture can be drawn away through suitable piping 36 and routed to a fuel cell or other suitable structure. Alternatively, this mixture can be rerouted to the air inlet pipe 26 for use in supporting combustion in the chamber 10. In this way, objectionable sulfur-bearing gases and nitrous oxides are converted into less objectionable materials, some of which can be used elsewhere in the system.

The reaction producing this exhaust gas is well known; it is described, for example, in Pauling, *College Chemistry*, pages 148-149 (third edition, 1964, W. H. Freeman & Company, San Francisco). As the steam and air pass over the iron particles or filings, at temperature of about 600 degrees centigrade, a reaction occurs:

$$3Fe + 4H_2O \rightarrow Fe_3O_4 + 4H_2$$

After this system has been operated for some time, the iron particles or filings will have been converted into iron oxide, $Fe_3O_4$. This iron oxide can be regenerated or returned to iron particles by passing carbon monoxide, CO, over the heated oxide:

$$Fe_3O_4 + 4CO \rightarrow 3Fe + 4CO_2$$

If desired, the carbon monoxide required for this regeneration reaction can be obtained, at least in part, through the exhaust gasses emanating from the exhaust pipe 136, and by suitable separation equipment (not shown).

The following is claimed as invention:

1. A power production system, comprising, in combination, a firebox, means for introducing oxygen-containing air to the firebox, means for introducing fuel to the firebox for combustion, heat transfer means for transferring combustion heat to a fluid, transducer means connected to the heat transfer means for utilizing the heated fluid to provide mechanical work, and converter means disposed adjacent the firebox to receive heat therefrom and having an inlet to receive gaseous products of combustion from the firebox, the converter means being adapted to utilize the received heat to assist in chemically converting the gaseous products of combustion into less objectionable materials.

2. A system according to claim 1 wherein said means for introducing fuel includes fuel transport means for moving fuel through at least part of the firebox while restricting oxygen access to the fuel to correspondingly restrict full fuel combustion and heat generation, and a combustion chamber for burning the fuel in the presence of oxygen.

3. A system according to claim 1 wherein said transducer means includes a cylinder, a piston disposed for reciprocation in the cylinder, intake valve means disposed upstream of the cylinder for intermittently admitting fluid to the cylinder so as to drive the piston along the cylinder, and exhaust valve means for permitting fluid to leave the cylinder.

4. A system according the claim 3 wherein said transducer means further including a turbine means, the turbine means including a turbine wheel, and fluid nozzle means adapted to intermittently receive quantities of a pressurized secondary fluid from the cylinder and to direct the pressurized secondary fluid against the turbine wheel blades.

5. A system according to claim 4 including a plurality of turbine means and a common power shaft adapted to be driven by each of said turbine means.

6. A system according to claim 1 including recirculating means for transferring fluid from the transducer means back to the heat transfer means for reheating.

7. A system according to claim 1 including return means connected to the converter means and the firebox means for returning gases produced in the converter means to the firebox for recombustion.

8. A system according to claim 1 including injector means for injecting a secondary fuel into said transducer means for producing additional amount of power in the system.

9. A power production system, comprising, in combination, a firebox adapted to sustain combustion therein, heat transfer means adapted to receive heat from the firebox and heat a fluid in the heat transfer means, conduit means for leading heated fluid from the heat transfer means, transducer means connected to the conduit means for providing mechanical work from the heated fluid, return conduit means for returning fluid from the transducer means to the heat transfer means, converter means adapted to receive heat and gaseous products of combustion from the firebox and to utilize the heat in chemically converting the gaseous products of combustion into less objectionable gases, and gas return means for returning the less objectionable gases from the converter means to the firebox for recombustion.

10. A system according to claim 9 wherein said transducer means includes a cylinder, a piston disposed for reciprocation in the cylinder, intake valve means disposed in the conduit means upstream of the cylinder for intermittently admitting fluid to the cylinder so as to drive the piston along the cylinder, and exhaust valve means in the return conduit means for permitting fluid to leave the cylinder and return to the heat transfer means.

11. A system according to claim 10 wherein said transducer means further includes a turbine means, the turbine means including a turbine wheel, and fluid nozzle means adapted to intermittently receive quantities of a pressurized secondary fluid from the cylinder and to direct the pressurized secondary fluid against the turbine wheel blades.

12. A system according to claim 11 including a plurality of turbine means and a common power shaft adapted to be driven by each of said turbine means.

13. A system according to claim 9 including injector means for injecting a secondary fuel into said transducer means for producing additional amounts of power in the system.

14. A system according to claim 9 wherein said converter means includes means for presenting iron filings to the passage of said products of combustion.

* * * * *